Figure 1:
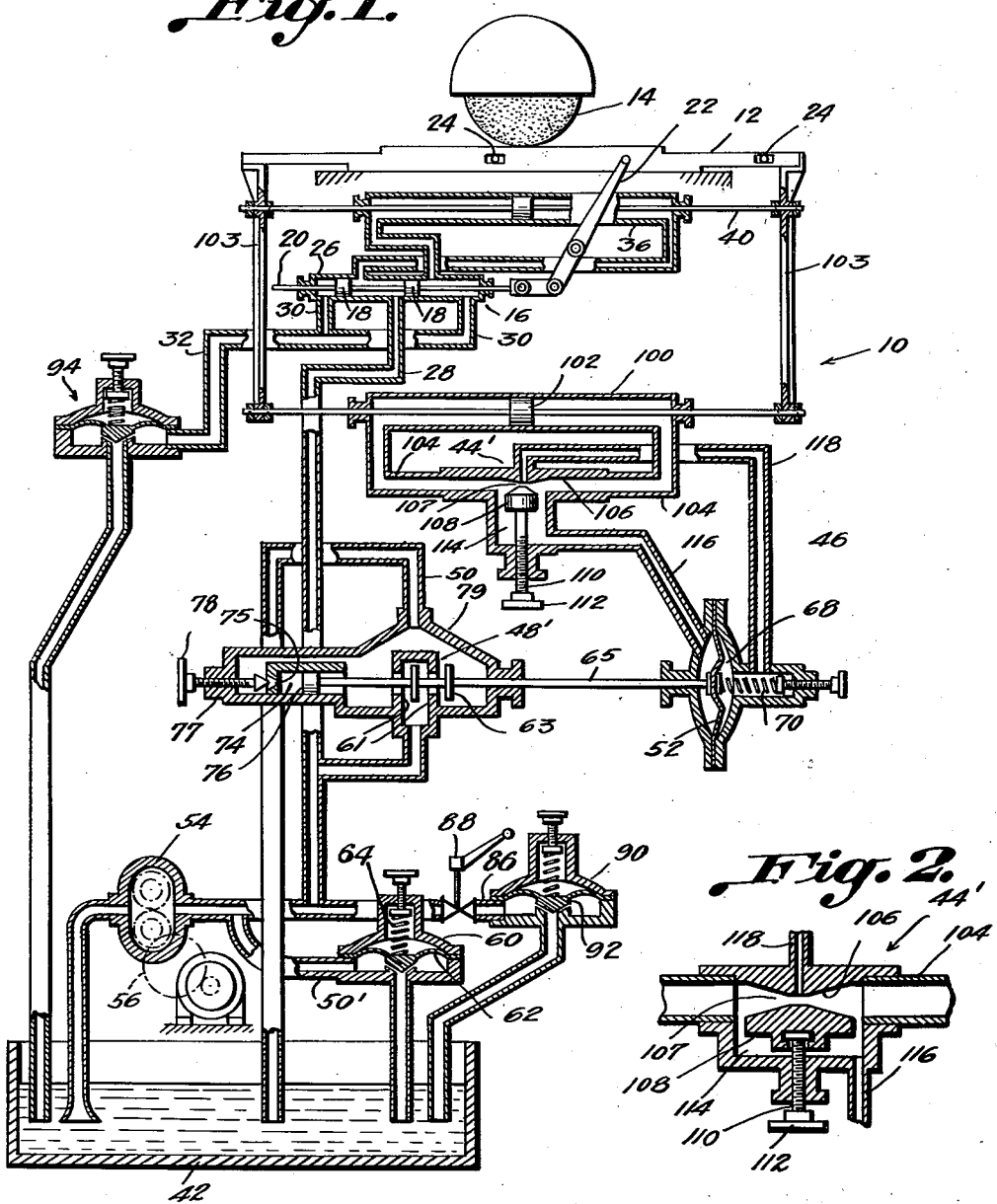

June 11, 1935.  E. S. SMITH, JR  2,004,638

SPEED GOVERNOR FOR HYDRAULIC DRIVES

Filed Dec. 22, 1931

Inventor.
Ed S. Smith, Jr.
By Thomas A. Jenckes
Attorney.

Patented June 11, 1935

2,004,638

UNITED STATES PATENT OFFICE 2,004,638

SPEED GOVERNOR FOR HYDRAULIC DRIVES

Ed S. Smith, Jr., Providence, R. I., assignor to Builders Iron Foundry, Providence, R. I., a corporation of Rhode Island Application December 22, 1931, Serial No. 582,576

4 Claims. (60—52)

My invention relates to an apparatus for controlling the movement of a movable member particularly adapted for use in machine tools having a reciprocatable member.

An object of my invention is to maintain a constant movement of a movable driven member at whatever value is desired.

An object of my invention consists in controlling by the movement of the member alone the driving means for the member so that if the speed of the movable member should fall off slightly the speed of the driving means would be increased and similarly if the movement of the movable member should increase slightly on the falling off of load then automatically shutting down the speed of the driving means to maintain the speed uniform. As stated hitherto my invention is particularly adapted for use in machines having a reciprocatable member having a driving means therefor. My invention includes flowing a fluid in response to the movement of the movable member for controlling the driving means for the movable member by variations of said fluid flow. My invention is particularly adapted for use in machine tools or otherwise where fluid pressure actuated means are employed to drive the movable member. The flow of fluid through the fluid pressure actuating means itself or through an auxiliary stream is made to correspond to the movement of the member or table and the movement of the fluid in the auxiliary stream or in the fluid pressure actuating means itself automatically controls the speed of fluid flow itself in the main flow stream so as to maintain a substantially even speed of the movable member, thus where employed on a machine tool having a reciprocating work holding member if for any reason the table speed would fall off slightly due to other influences, such as tool resistance or otherwise, more fluid would be fed to the fluid pressure actuating or reciprocating means or moving means for the table and similarly if the table speed should increase slightly upon a falling off of the load or resistance to the tool after taking a heavy cut or by passing by the work the speed of the table immediately brings about additional throttling of the flow.

A further feature of my invention consists of the improved apparatus I employ for controlling the movement of a movable member subject to other influences affecting its movement, which comprises setting up a fluid flow in the driving means for the member in excess of the amount necessary to give it its desired movement and in which the speed of the fluid is affected by any variations in the movement of said member and controlling the speed of fluid flow and hence movable member movement by automatically bypassing from said main flow stream the excess of the amount of fluid necessary to continuously maintain a constant movement of the movable member regardless of said other influences. While this may be done in any suitable manner I preferably create a source of differential pressure in an auxiliary flow stream moving in response to said movable member and I automatically control the amount of excess fluid bypassed to keep the movable member at a constant speed by means of said differential pressure produced.

Other features of my invention relate to various details of construction for various manners of controlling the speed of fluid flow or the speed of the driving means and particularly in a fluid system to provide a means which in addition will partially stop the movable member and at the same time will prevent an ingress of air into the fluid operating system.

A further feature of my invention resides in one embodiment thereof of the novel type of adjustable Venturi meter tube which may be employed as an adjustable valve and set for any rate of flow desired and which will operate in opposite directions.

A great difficulty has been experienced in grinding machines and other types of machine tools in having a variable table speed. Employing my invention, however, which operates with extreme reliability and certainty, the table is fed at substantially constant speed and gives an excellent finish to the work.

These and such other objects of my invention as may hereinafter appear will be best understood from a description of the accompanying drawing which illustrates various embodiments thereof.

In the drawing, Fig. 1 is a diagrammatic view partially shown in section of a machine tool having a reciprocating member and driving means therefor constructed in accordance with my invention.

Figure 2:
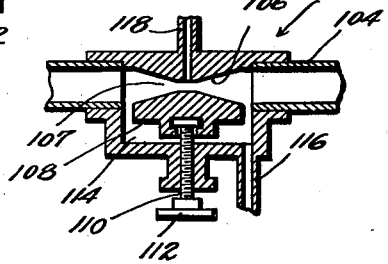

Fig. 2 is a sectional view taken through the improved type of reversible Venturi-shaped pressure differential producing valve I preferably employ.

In the drawing, wherein like characters of reference indicate like parts throughout, 10 generally indicates a machine tool constructed in accordance with my invention. Said machine tool includes the usual movable member 12, which in this instance comprises a reciprocatable table 12 adapted to hold the work and adapted to function in association with the rotatable grinding wheel 14 on said work. In the embodiment shown the driving means for the reciprocatable member 12 comprises a fluid pressure actuated system, in which the direction of movement of the table is automatically controlled by the fluid pressure actuating valve 16. Said valve 16 comprises the usual two pistons 18 mounted on a valve piston rod 20 in turn controlled by an oscillating lever 22 actuated by the table dogs 24 to move the pistons 18 alternately first to the right and then to the left in a reciprocating valve cylinder 26 which has the usual inlet pipe 28 entering therein substantially centrally thereof and the usual outlet pipes 30 discharging from opposite ends thereof and into the outlet pipe 32. The pipes 34 connect the opposite ends of the valve cylinder 26 with the fluid pressure actuating cylinder 36, in which reciprocates a piston 38 connected in a suitable manner such as by the piston rods 40 with the reciprocating table 12. The fluid pressure actuating reciprocating means thus includes the cylinders 26 and 36 with their interconnecting parts. Inasmuch as the usual load and fire mechanism operated by dogs 24 and oscillating trip lever 22 is already readily available to engineers, it is deemed unnecessary and undesirable to show and/or describe them in detail; for to do so would tend to obscure rather than clarify a disclosure of the salient characteristics. For the benefit of those not versed in the art, however, reference is made to British Patent No. 297,104, or its corresponding U. S. Patent 1,838,028, which very fully shows valve and trip means such as are herein indicated diagrammatically by parts 16, 22 and 24 as well as other details of a complete machine.

I provide an inlet pipe 28 leading to said reciprocating means from a source of fluid such as the reservoir 42 and I provide the common discharge pipe 32 leading from said reciprocating means to said reservoir, thus as shown in Fig. 1 the whole fluid system including the aforementioned cylinders comprises the driving means for the reciprocating table 12. It is apparent that the flow of fluid through said system will vary particularly in the inlet portion thereof in response to other influences such as tool resistances, inequality of work etc. which affects the movement of the table. Fluid therefore is flowed through the system in proportion to the movement of the movable member. I provide means such as the adjustable reversible valve 44' shown in Fig. 1 for for setting up an adjustable pressure differential in an auxiliary flow stream 46 as shown in Fig. 1 which contains a fluid movable in response to the table movement and hence subject to the same variation. I control by said differential the flow through the main flow stream by a controller valve 48' in a bypass line 50 connected to said main flow stream as shown in Fig. 1. It is obvious that the rate of flow through the inlet pipe 28 is controlled inversely in proportion to the changes in the table speed and a bypass flow is controlled directly in proportion thereto, in other words the pressure controls the valve directly in proportion to variations in the fluid flow affected. The means automatically controlled by said pressure differential for varying the movement of said driving means and hence movable member includes not only the controller valve 48', but the diaphragm 52 actuated in response to changes in the differential. I provide means such as the pump 54 to pump fluid from said fluid reservoir 42 through the inlet pipe 28 and the pump functions in such a manner to supply through the line 28 an amount in excess of the amount of fluid desired for moving the movable member 12 and in my invention the amount of fluid not needed to move the member 12 at the desired speed in response to variations in the movement of the member is bypassed through the bypass line 50. The pump 54 may be provided with the change speed gearing 56 in case large changes are made in the character of the work. As shown in Fig. 1 the bypass line 50' is provided with a pressure relief valve 60 which may be set say at any desired maximum say 100 lbs. and which will automatically open the pressure relief valve 60 comprising a usual diaphragm 62 and spring 64 which will normally permit the flow of fluid around the solid center portion thereof and which when the pressure is increased more than the set maximum will permit the spring 64 to compress and periodically or otherwise bypass any excess of fluid through the bypass line 50'. The controller valve 48' may have the valve head 63 conveniently mounted on a piston rod 65 and the diaphragm 52 oscillating in the chamber 68 is also attached to said rod 65. An adjustable spring 70 normally urges said piston rod 65 and hence valve head 63 towards the valve seat 61 to close the valve. The opposite end of said piston rod 65 is provided with a piston 76 working in a dashpot 74, having an open outer end forming a valve seat 75, in which the throttling piston 76 reciprocates with variations in the differential pressure across diaphragm 52. The valve head 77 is provided with means to adjust the amount of opening in the throttling valve seat 75 such as the hand wheel operated throttling means 78 adjustable from without and it is obvious that by varying the opening of the throttling valve from the dash pot 74 that the throttling valve will oppose the spring 70 so as to throttle down any violent movement of the diaphragm 52. The controller valve 63 and piston rod 65 operate within chamber 79. Diaphragm 52 is within chamber 68 to which pressure pipes 116 and 118 are operatively attached. Diaphragm 52 is connected to valve 63 by piston rod 65. It is thus apparent that the pressure differential producing valve 44' may be adjusted for any set desired speed of table reciprocation and that it will automatically create a pressure differential between the high pressure side of said diaphragm 52 and the low pressure side and that the differential produced will vary in proportion to the corresponding rates of flows through the pipes 28 and 104. If the speed of the table 12 should fall therefore, a smaller differential will be set up between the high and low pressure sides of the valve 44' thereby permitting the spring 70 to close the valve 48' so as to feed more fluid through the inlet pipe 28 and similarly as the table speed increases, such as by falling off of the load, then the pressure differential will increase to operate to move the diaphragm 52 to open the controller valve 48' to permit the flow of less fluid through the inlet line 28. As stated an excess of fluid flow rate is set up by the pump 54 over that necessary to maintain the desired speed of the table. There is substantially constantly at intermittent intervals an amount of fluid bypassed through the line 50 in excess of the amount required to drive the table so that regardless of any changes in the table speed the pressure will be maintained at the high pressure side of the pump. It is obvious that as the controller valve 48' closes the fluid under pressure will build up until the fluid flows through the inlet pipe at a rate to again bring the table up to the desired speed and correspondingly as the controller valve 48' is open fluid pressure is lowered.

I also preferably provide manually operated means to stop the movable member and hence table at any desired position. To this end I provide the bypass line 86 connected to the inlet 28 preferably discharging into the fluid reservoir 42. Said bypass line is provided with the manually operated bypass valve 88. I also provide in said line 86 the pressure relief valve 90 comprising a usual spring actuated diaphragm valve but in which the valve head 92 is adapted to completely shut off the bypass line. A similar type of pressure relief valve 94 is provided in the outlet line 32. The pressure relief valve 90 in the bypass 86 is set at a relatively slight pressure such as two lbs. to prevent ingress of air into the system. The pressure relief valve 94 in the outlet line is also for a similar purpose, but this is set at a relatively higher pressure than the pressure relief valve 90, such as 4 lbs., and as the pressure in the valve 90 bypassed from the inlet is always less than the pressure from the valve 94 in the outlet, it is obvious that there will be no pressure to move the table and thus there is no possibility of a flow through the system when the manually operated bypass valve is opened. The controller valve 48' is provided with the dash pot 74 so that there will be no danger of hunting back and forth. Due to the pressure relief valves 90 and 94 there is also no possibility of getting any air in the system. It is obvious therefore that in Fig. 1 the fluid system itself includes the inlet pipe 28, the outlet pipe 32 and their attached parts, the bypass line 86 and the reciprocating valve and motor cylinders 26 and 36. When it is desired to stop the table it is obvious that merely opening the bypass valve 88 will immediately shut off all operating fluid pressure in the system thereby providing a positive stop of the table, but due to the pressure relief valves 90 and 94 there will be no ingress of air in the fluid system itself.

As shown in Fig. 1 a flow of fluid is created in response to the movement of the table 12 in an auxiliary flow system which in turn controls the speed of a separate driving means for the table and the speed of fluid flow which controls the driving means which is not of itself that fluid which moves the table. It is obvious that in place of fluid pressure actuating driving means for reciprocating the table any other type of driving means may be employed. I provide an auxiliary fluid pressure system comprising a cylinder 100 having a piston 102 reciprocated therein and connected to the table 12 to be reciprocated in correspondence to the movements thereof through the brackets 103 connected to opposite ends of said table. It is obvious that with the changes of movement of the table 12 fluid will flow alternately from one end to the other of said cylinder 100 through the connecting pipes of the auxiliary system 46 including the adjustable pressure differential producing valve 44' therein. The pressure differential produced in the auxiliary flow system 46 automatically controls the controller valve 48' located in the bypass line 50 from the inlet line 28 for the main flow stream of the fluid system for driving the table. The controller valve 48' is so constructed that when too high a rate exists, valve 48' opens somewhat. The differential pressure is created in the auxiliary fluid system 46 and the adjustable pressure differential producing means comprises a novel type of modified Venturi meter shown in section in Fig. 2 which is so constructed as to produce an equal amount of pressure differential on the flow through the auxiliary flow system in either direction. This valve comprises a fixed hemi-Venturi tube 106 and a relatively movable hemi-Venturi tube 108 adjustable relative thereto. This valve 44' is interposed in the pipe 104 and is obvious that the adjustable hemi-Venturi tube 108 forms a valve head therefor. The movement of the adjustable hemi-Venturi tube 108 is controlled by the medium of the adjustable stem 110 provided with the usual hand wheel 112 adjustable in position from without. The adjustable hemi-Venturi tube 108 is mounted in the enlarged chamber 114 opposite the fixed hemi-Venturi meter tube 106 and the ends of the adjustable hemi-Venturi tube are spaced from each end of the chamber 114 so that pressure is led from either end of the Venturi tube and out through the pipes 116 to the high pressure side of the diaphragm 52. The pipe 118 connects the throat of the fixed hemi-Venturi meter tube to the low pressure side of the diaphragm 52. The sides of both the fixed and movable hemi-Venturi tubes converging and diverging respectively from the throat 107 are both of an equal length and equally angularly converging or diverging in either direction so that an equal pressure differential will be produced regardless of the direction of the flow through the valve 44' in the pipe 104. In this instance the pressure relief valve 60 is interposed in the separate bypass line 50' connected to the inlet 28 or may be in the same bypass line 86 as the manually operated bypass valve 88. The adjustable pressure differential producing valve 44' is set so as to control the speed of fluid through the inlet pipe 28 at the desired speed by adjusting the movable hemi-Venturi tube relative to the fixed hemi-Venturi tube. It is thus obvious that fluid will move through the auxiliary fluid system 46 in response to changes in the speed or the movement of the table 12 and that a pressure differential will be set up by said pressure differential producing valve 44' by the movement of the fluid through said auxiliary system in either direction proportionate to the square of the speed of reciprocating movement of said table 12 and it is obvious that the pressure differential set up will instantly vary in response to changes in the speed of the table. As the pressure differential produced by said pressure differential producing valve 44' varies in response to the changes of speed of fluid through the auxiliary fluid system 46 in response to changes in movement of the movable table, it is obvious that the pressure will affect the movement of diaphragm 52 to open the controller valve 48' directly in response to changes in said pressure differential. It will affect the opening of said valve 48' to bypass the excess of fluid received through the line 50 to maintain a correct amount of fluid flow through the inlet line 28 of the reciprocating valve and motor cylinders 26 and 36 respectively so that the movement of the driving means that depends on the rate of flow of fluid through the main fluid system, will vary in response to changes of the speed of the table. Thus when the table slows down for any reason diaphragm 52 will close valve 48' so that there will be less fluid bypassed through the valve 48' and more fluid passed through the inlet line 28 to bring the speed up to the desired amount, and conversely as the table increases in speed will the flow of fluid through the inlet pipe 28 be decreased by valve 48'. The pump 54 operates to maintain a constant excess of fluid through the system and an amount of fluid is substantially continuously bypassed through the bypass line 50 to keep the flow of fluid through the main fluid system and inlet pipe 28 thereof correct to maintain the desired speed of movement of the movable member 12. It is obvious that employing my invention I have provided an apparatus for controlling the speed of a member which automatically functions to maintain it at a relatively constant speed with the desired evenness of finish etc. in the work.

It is understood that my invention is not limited to the specific embodiment shown and that various deviations may be made therefrom without departing from the spirit and scope of the appended claims.

What I claim is:

1. In a machine, a movable member subject to other influences affecting its movement, a fluid system for driving said members, means to supply fluid to said fluid system in excess of the amount necessary to give it the desired movement, an auxiliary flow stream responsive in its movement to the movement of the movable member, means to set up a differential pressure in said auxiliary flow stream, a bypass line in said main fluid system, a controller valve in said bypass line, and means actuated by said differential produced by said auxiliary flow stream operative to control said controller valve in said bypass line to automatically bypass from the main flow of fluid in said system an excess of the amount of fluid necessary to continuously maintain a substantially constant movement of the movable member regardless of said other influences.

2. In a machine, a movable member subject to other influences affecting its movement, a fluid system for driving said member, means to supply fluid to said fluid system in excess of the amount necessary to give it the desired movement, an auxiliary flow stream responsive in its movement to the movement of the movable member, a bypass line in said main fluid system, a controller valve in said bypass line, and means actuated by said auxiliary flow stream operative to control said controller valve in said bypass line to automatically bypass from the main flow of fluid in said system an excess of the amount of fluid necessary to continuously maintain a substantially constant movement of the movable member regardless of said other influences.

3. In a machine tool, a reciprocatable member subject to other influences affecting its movement, fluid pressure means for reciprocating said member, an inlet line connecting said means with a fluid reservoir, an outlet line discharging from said fluid pressure reciprocating means into said fluid reservoir, a pump in said inlet line adapted to feed fluid to said fluid pressure reciprocating means in excess of the amount necessary to move the reciprocatable member at the desired speed, a closed fluid system containing fluid movable in opposite directions in response to the movement of the reciprocating member due to said other influences, an adjustable pressure differential producing valve comprising an adjustable Venturi tube in said closed system, a bypass line leading from said inlet line having a controller valve therein and means operable by the differential pressure produced by said pressure differential producing means in said closed system to move said controller valve to bypass from said main inlet line to said fluid reciprocating means varying amounts of fluid therefrom in response to changes in said pressure differential to vary the speed of flow of fluid of the reciprocating means in response to changes in the speed of fluid in said closed system in response to changes in the speed of the reciprocating member to maintain a substantially constant speed of the reciprocating member.

4. In a machine tool, a reciprocatable member subject to other influences affecting its movement, fluid pressure means for reciprocating said member, an inlet line connecting said means with a fluid reservoir, an outlet line discharging from said fluid pressure reciprocating means into said fluid reservoir, a pump in said inlet line adapted to feed fluid to said fluid pressure reciprocating means in excess of the amount necessary to move the reciprocatable member at the desired speed, a closed fluid system containing fluid movable in opposite directions in response to the movement of the reciprocating member due to said other influences, an adjustable pressure differential producing valve in said closed system, a bypass line leading from said inlet line having a controller valve therein and means operable by the differential pressure produced by said pressure differential producing means in said closed system to move said controller valve to bypass from said main inlet line to said fluid reciprocating means varying amounts of fluid therefrom in response to changes in said pressure differential to vary the speed of flow of fluid of the fluid reciprocating means in response to changes in the speed of fluid in said closed system in response to changes in the speed of the reciprocating member to maintain a substantially constant speed of the reciprocating member.

ED S. SMITH, Jr.